UNITED STATES PATENT OFFICE 2,323,593

MANUFACTURE OF CHLORINE DIOXIDE

Clifford Allen Hampel and Maurice C. Taylor, Niagara Falls, N. Y., assignors to The Mathieson Alkali Works, Inc., New York, N. Y., a corporation of Virginia No Drawing. Application October 8, 1941,
Serial No. 414,140

4 Claims. (Cl. 23—152)

Our invention relates to improvements in the production of chlorine dioxide. We have discovered that chlorites react with persulfates, under appropriate conditions, to form chlorine dioxide.

According to our invention, chlorine dioxide is produced by reacting a chlorite with a persulfate in the presence of water at a pH between about 3 and 11. The term "persulfate" is employed herein and in the appended claims to designate a salt of persulfuric acid, i. e., $H_2S_2O_8$. While we cannot explain the reaction, the yields secured suggest that the reaction may be typified somewhat as follows:

$$2NaClO_2 + Na_2S_2O_8 \rightarrow 2ClO_2 + 2Na_2SO_4$$

The reaction occurs over the indicated wide range of pH values. The reaction is unique, with reference to the production of chlorine dioxide, in that it proceeds satisfactorily at pH values above 8, from 8 to 11, whereas other methods usually are ineffective at pH values above about 8. The reaction proceeds most rapidly at pH values between about 5 and 9. Below a pH of about 3, the reaction rate drops off markedly. Above a pH of about 11 the reaction becomes inefficient through the production of chlorates, apparently through side reactions involving chlorine dioxide formed as an intermediate. The reaction proceeds efficiently at ordinary temperatures, 20°–25° C. However, the reaction rate can be increased by increasing the temperature and the reaction can be carried out with efficiencies as high as 75% at temperatures as high as 65° C. Concentrations are not critical, but increasing concentrations increase the reaction rate without much effect upon the efficiency of the reaction. Also, the proportion of chlorite reacting is usually increased by increasing the concentration of chlorite. Proportions of chlorite exceeding the ratio of chlorite to persulfate indicated in the foregoing equation tend to decrease the reaction rate.

The chlorites useful in carrying out our invention comprise the chlorites of the alkali metals and of the alkaline earth metals. The persulfates useful in carrying out our invention comprise the persulfates of the alkali metals and of the alkaline earth metals including magnesium. Examples of useful chlorites include, particularly, sodium chlorite and calcium chlorite and examples of useful persulfates include, particularly, sodium persulfate and potassium persulfate.

The following examples will further illustrate our invention:

Example I 20 cc. of an aqueous solution containing 1.76 moles of sodium chlorite per liter were placed in a closed reaction vessel and 0.0201 mole of sodium persulfate was added to this solution. A stream of air was passed through the combined solution while maintaining a temperature of 20°–25° C. for one hour. The gas mixture from the reaction vessel was passed through an absorption tower. 0.0334 mole of chlorine dioxide was produced, this production corresponding to a chlorine dioxide yield of 95% based on the chlorite supplied to the reaction.

Example II 150 cc. of an aqueous solution containing 0.144 mole per liter of sodium chlorite were placed in a closed reaction vessel, buffered with an acetate buffer at a pH of 3.2. 4.014 grams of sodium persulfate were added to the solution. A stream of air was passed through the combined solution while maintaining a temperature of 20°–25° C. for one hour. The gas mixture from the reaction vessel was passed through an absorption tower. 0.00273 mole of chlorine dioxide was produced.

Example III 150 cc. of an aqueous solution containing 0.144 mole per liter of sodium chlorite were placed in a closed reaction vessel and buffered with a phosphate buffer at a pH of 6.9. 4.014 grams of sodium persulfate were added to the solution. A stream of air was passed through the combined solution while maintaining a temperature of 20°–25° C. for one hour. The gas mixture from the reaction vessel was passed through an absorption tower. 0.00629 mole of chlorine dioxide was produced.

Example IV 150 cc. of an aqueous solution containing 0.144 mole per liter of sodium chlorite was placed in a closed reaction vessel, buffered with a phosphate buffer at a pH of 9.1. 4.014 grams of sodium persulfate were added to the solution. A stream of air was passed through the combined solution while maintaining a temperature of 20°–25° C. for one hour. The gas mixture from the reaction vessel was passed through an absorption tower. 0.0073 mole of chlorine dioxide was produced.

*Example V*

150 cc. of an aqueous solution containing 0.144 mole per liter of sodium chlorite was placed in a closed reaction vessel and buffered with a phosphate buffer at a pH of 10.75. 4.014 grams of sodium persulfate were added to the solution. A stream of air was passed through the combined solution while maintaining a temperature of 20°–25° C. for one hour. The gas mixture from the reaction vessel was passed through an absorption tower. 0.0037 mole of chlorine dioxide was produced.

*Example VI*

150 cc. of an aqueous solution containing 0.144 mole per liter of sodium chlorite were placed in a closed reaction vessel, buffered with an acetate buffer at a pH of 7.08. 4.014 grams of sodium persulfate were added to the solution. A stream of air was passed through the combined solution while maintaining a temperature of 65° C. for one and one-half hours. The gas mixture from the reaction vessel was passed through an absorption tower. 0.0141 mole of chlorine dioxide was recovered. 89.5% (0.0193 mole) of the sodium chlorite reacted representing an efficiency of reaction of 73%.

We claim:

1. In the production of chlorine dioxide, the improvement which comprises reacting a chlorite of a metal of the class consisting of the alkali and alkaline earth metals with a persulfate of a metal of the class consisting of alkali and alkaline earth metals in the presence of water at a pH between about 3 and about 11.

2. In the production of chlorine dioxide, the improvement which comprises reacting sodium chlorite with sodium persulfate in the presence of water at a pH between about 3 and about 11.

3. In the production of chlorine dioxide, the improvement which comprises reacting sodium chlorite with sodium persulfate in the presence of water at a pH between about 3 and about 11 while maintaining a temperature of about 20°–65° C.

4. In the production of chlorine dioxide, the improvement which comprises reacting a chlorite of a metal of the class consisting of the alkali and alkaline earth metals with a persulfate of a metal of the class consisting of alkali and alkaline earth metals in the presence of water at a pH between about 5 and about 9.

CLIFFORD ALLEN HAMPEL.
MAURICE C. TAYLOR.